(12) United States Patent
Northway et al.

(10) Patent No.: US 8,126,478 B2
(45) Date of Patent: Feb. 28, 2012

(54) SYSTEM AND METHOD OF USING LOCATION BASED SYSTEMS FOR PROVIDING SERVICES

(75) Inventors: Tedrick N. Northway, Wood River, IL (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 12/121,307

(22) Filed: May 15, 2008

(65) Prior Publication Data
US 2009/0286553 A1    Nov. 19, 2009

(51) Int. Cl.
*H04W 24/00* (2009.01)
(52) U.S. Cl. ............... 455/456.3; 455/414.1; 455/456.1; 701/207
(58) Field of Classification Search ............... 455/414.2, 455/456.1, 456.3
See application file for complete search history.

(56) References Cited

U.S. PATENT DOCUMENTS

| | | | |
|---|---|---|---|
| 6,452,498 B2 | 9/2002 | Stewart | |
| 6,535,132 B2 * | 3/2003 | Waters et al. | 340/573.1 |
| 6,647,269 B2 * | 11/2003 | Hendrey et al. | 455/456.3 |
| 6,879,838 B2 * | 4/2005 | Rankin et al. | 455/456.6 |
| 7,027,801 B1 | 4/2006 | Hall et al. | |
| 7,089,264 B1 | 8/2006 | Guido et al. | |
| 2006/0270421 A1 | 11/2006 | Phillips et al. | |
| 2006/0286989 A1 | 12/2006 | Illion | |
| 2007/0136132 A1 * | 6/2007 | Weiser et al. | 705/14 |
| 2010/0113066 A1 * | 5/2010 | Dingler et al. | 455/456.3 |

FOREIGN PATENT DOCUMENTS

| | | | |
|---|---|---|---|
| WO | WO 2005/052885 | * | 6/2005 |
| WO | WO 2007/051223 | | 5/2007 |

OTHER PUBLICATIONS

Munson et al., "Location-Based Notification as a General Purpose Service", Sep. 28, 2002 (WMC '02).*
Spinney, J. "Telecom Web Services & GeoSpatial Web Services Within Common IT Environments", URL: http://www.directionsmag.com/article.php?article_id=709&trv=1, Nov. 23, 2004, pp. 1-7.

* cited by examiner

*Primary Examiner* — Nick Corsaro
*Assistant Examiner* — Michael S Bush
(74) *Attorney, Agent, or Firm* — Anna L. Linne; Roberts Mlotkowski Safran & Cole, P.C.

(57) ABSTRACT

A location based system is provided for providing messages to a user and, in particular, to a location based advertising system using multiple geo-boundaries and which is configured to provide advertisements to a user and to track the effectiveness of such advertisements. The method includes defining a zone with a plurality of geo-boundaries and detecting when a mobile user has crossed a first boundary of the plurality of geo-boundaries and a second boundary of the plurality of geo-boundaries. The method further includes sending a message to the mobile user upon the determining that the mobile user has crossed the first boundary.

25 Claims, 5 Drawing Sheets

SYSTEM AND METHOD OF USING LOCATION BASED SYSTEMS FOR PROVIDING SERVICES

FIELD OF THE INVENTION

The invention generally relates to a location based system for providing messages to a user and, in particular, to a location based advertising system using multiple geo-boundaries and which is configured to provide advertisements to a user and to track the effectiveness of such advertisements.

BACKGROUND

Faced with an increasingly difficult challenge in growing both average revenue per user (ARPU) and numbers of subscribers, wireless carriers are trying to develop a host of new products, services, and business models based on data services. One such service is location services, which provide information specific to a location. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. An example of location-based services that can be provided to the mobile user is the use or advertisements such as, for example, directing the user to the nearest business or service, such as an ATM or restaurant. These advertisement services may also include, for example, providing alerts, such as notification of a sale on gas.

While the potential of these services is great, and there is a considerable amount of interest with respect to these services, there are some critical flaws that limit content providers (advertisers) using location-based services. These critical flaws have limited the rollout and deployment of these services and, basically, have limited the revenue that can be generated from such services.

Illustratively, when a mobile device is used in conjunction with A-GPS or tower based location systems, the system uses a center point with a radius to determine a proximity location in order to provide any advertisement to the user. This produces a single proximity, which is attributable to a number of issues. First, there is no mechanism, method or system to determine whether a user actually took advantage of the advertisement, e.g., purchased a product based on the advertisement. For example, a single proximity cannot determine if the user went into a store or building or other environment, which provided the advertisement. In addition, current location based systems cannot accommodate skipping. That is, in current single proximity based location systems, the user may skip in and out of the single proximity, however, each time the user skips in and out the singe proximity, the same advertisement will be resent to the user (i.e., resulting in spamming to the user). This clearly unnecessarily consumes resources, as well as becomes annoying to the user.

Accordingly, there exists a need in the art to overcome the deficiencies and limitations described hereinabove.

SUMMARY

In a first aspect of the invention, a method comprises defining a zone with a plurality of geo-boundaries and detecting when a mobile user has crossed a first boundary of the plurality of geo-boundaries and a second boundary of the plurality of geo-boundaries. The method further comprises sending a message to the mobile user upon the determining that the mobile user has crossed the first boundary.

In another aspect of the invention, a computer program product comprising a computer usable medium having readable program code tangibly embodied in the medium is provided. The computer program product is operable to determine when a mobile user has crossed into a zone defined by a first boundary and a second boundary, and provide an advertisement to the mobile user when the mobile user has crossed over the first boundary. The advertisement is associated with a subscriber of services of the computer program product. The computer program product is also operable to: provide a second advertisement to the mobile user if the mobile user does not cross over the second boundary within a predetermined amount of time or if the mobile user crosses into another zone prior to crossing over the second boundary; and/or determine that the mobile user has crossed over the second boundary and use such information to deduce that the mobile user at least entered or exited an environment associated with the advertisement.

In yet another aspect of the invention, a method for advertising comprises providing a computer infrastructure. The computer is operable to: detect when a mobile user has crossed a first boundary of a plurality of geo-boundaries and a second boundary of the plurality of geo-boundaries which define a zone; and send an advertisement to the mobile user upon crossing the first boundary.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
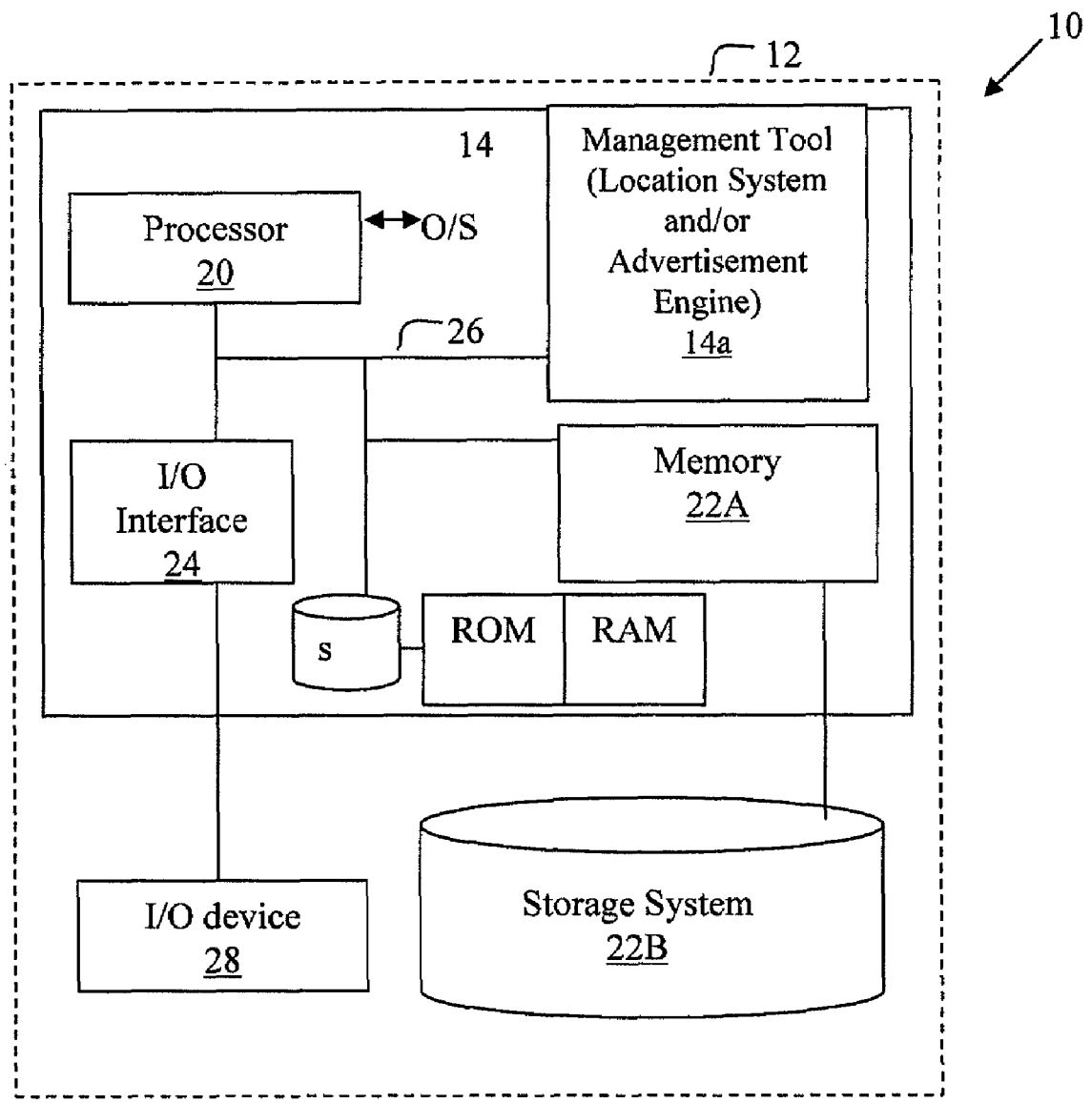
FIG. 1 shows an illustrative environment for implementing the steps in accordance with the invention.

The invention generally relates to a location based system for providing messages to a user and, in particular, to a location based advertising system using multiple geo-boundaries and which is configured to provide messages to a user and to track the effectiveness of such messages (e.g., advertisements). In implementation, the system and method creates and/or uses multiple geographic boundaries (geo-boundaries) or geographic references (geo-references) to create zones. These geographic boundaries, in turn, allow a service provider, e.g., network carrier, content provider, advertiser, third party service provider, to target advertising or other messages (hereinafter referred to as advertising or advertisements) to individuals using mobile devices based on a location of the individuals.

Advantageously, the present invention improves the operational efficiency associated with providing location-based information. For example, by providing a zone-based system with multiple geo-boundaries, it is possible to detect when a user crosses a boundary, which allows an advertiser, for example, to track the movements of the user of the mobile device. The tracking can be used to determine whether the targeted advertisement was effective in attracting the user to purchase the advertisement item and/or service from a certain store. The present invention can also advantageously be used to prevent spamming of advertisements to the user due to skipping as discussed herein.

In embodiments, the present invention can be implemented in numerous ways in order to obtain content from a content provider (e.g., advertiser) based on location information. It should be understood by those of skill in the art that although the location information can be obtained using known methodologies, the present invention significantly expands such methodologies by detecting boundaries for the location information, e.g., zones, and using such boundaries to track effectiveness of advertisements. For example, a local agent residing on the handheld device can use locally cached location information obtained by GPS, A-GPS or mechanisms other than the telecommunications network in order to determine location information. In other embodiments, the service provider (e.g., network carrier) can obtain the location based on triangulation methods and/or the signal-strength of the closest cell-phone towers. In the present invention, though, this location information is then bounded, in order to define an entry point and an exit point of the zone. These bounded entry and exit points can then be used to more effectively track a targeted user, thereby determining whether the targeted user entered or exited a store, building or other environment.

The signal provided by the mobile device to the network carrier or directly to the content provider may be, for example a wireless application protocol (WAP). Those of skill should recognize that WAP is an international standard for applications that uses wireless communications. WAP's principal application is to enable access to the Internet from a mobile phone or PDA (e.g., handheld device). A WAP browser provides all of the basic services of a computer based web browser but simplified to operate within the restrictions of the handheld device. Those of skill in the art should also appreciate that the present invention is not limited to WAP applications, but may be implemented using any wireless data protocol such as, for example, the Japanese i-mode system.

Exemplary System Environment and Infrastructure

FIG. 1 shows an illustrative environment 10 for managing the processes in accordance with the invention. To this extent, the environment 10 includes a server 12 that can perform the processes described herein. In particular, the server 12 includes a computing device 14. The computing device 14 can be resident on a carrier network infrastructure, a content provider server, or a server of a third party service provider.

The computing device 14 includes a Management Tool 14a configured to make computing device 14 operable to perform the services described herein. The Management Tool 14a is implemented using a program code as a software component, hardware component or a combination of both a software component and a hardware component. Additionally, the Management Tool 14a can be implemented in a computer infrastructure used as a location based system (e.g., network carrier), an advertisement engine (e.g., a content provider or other service provider) or as a combination of both a location based system and an advertisement engine.

In implementation of the Management Tool 14a will provide an efficient way in which content providers, advertisers, etc. can track the effectiveness of their advertisements or other services. For example, using the geo-boundaries associated with zones, the Management Tool 14a can detect when a user has entered and exited a zone. By knowing this information, the service provider (e.g., content provider, advertiser, third party service provider, etc.) can target advertising or other services to users of mobile devices entering the zone, and detect when a user has entered or exited a store, building or other environment associated with the advertisement. This allows the service provider to target advertisements to certain individuals based on location, as well as determine whether the advertisements were effective by noting whether the individual actually entered and/or exited the store, building or other environment.

In further embodiments, the Management Tool 14a can use multiple zones with multiple geo-boundaries to more effectively target individuals and advertisements and/or services. For example, by using multiple zones and geo-boundaries it is possible to track the user to an even finer granularity (smaller area) and hence target the advertisements and/or services more effectively. For example, if it is detected that the user has not entered the store, building or other environment, (not crossed a boundary) it is possible to provide another advertisement or a promotional to entice the user to enter the store, building or other environment, in the originally detected zone.

In embodiments, such detection can be made in one of several ways, e.g., entering another zone or not exiting the existing at a particular geo-boundary of the existing zone within a predetermined time period. As a non-limiting example using two zones "A" and "B" with respective geo-boundaries entry point $A_1$, exit point $A_2$ and entry point $B_1$, exit point $B_2$, it is possible to more effectively target advertisements and/or services based on the following non-limiting illustrative example:

Detect that the user is entering zone "A", as detected by the user passing through entry point $A_1$;
Provide an advertisement to the user for an item or service that is located in a store in zone "A";
Detect that the user did not make a purchase of the item or service or visit the store associated with the advertisement by detecting that the user did not enter of exit via the exit point $A_2$;
Detect that the user is entering zone "B" (or another zone), as detected by the user passing through entry point $B_1$ (or not exiting through exit point $A_2$ within a predetermined time period); and
Provide a promotional discount for the item as the mobile user is entering zone "B" (or not exiting through exit point $A_2$ within a predetermined time period) which is designed to entice the user to visit the store in zone "A".

Alternatively, as the user is entering zone "B", a different advertisement for a store in Zone "B" may be provided in order to entice the user to such new store.

In a further aspect of the invention, the Management Tool 14a can be used to prevent spamming due to skipping into and outside of the same zone. For example, the Management Tool 14a can include a timer or have access to a timer or user history in which the same advertisement will not be given to the user of the mobile device (e.g., as detected by a unique ID) during a predetermined period of time. This will ensure that the content provider will not provide the same advertisements to the mobile user based on the mobile user entering and exiting the same zone due to, for example, a winding road or other situation that might cause skipping.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any mobile device that enables an individual to interact with the computing device 14 or any device that enables the computing device 14 to communicate with one or more other computing devices using any type of communications link. The external I/O device/resource 28 may be for example, a handheld device, computing device, portable digital assistant, cellular telephone, etc.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Block Diagram of the Invention

Figure 2:
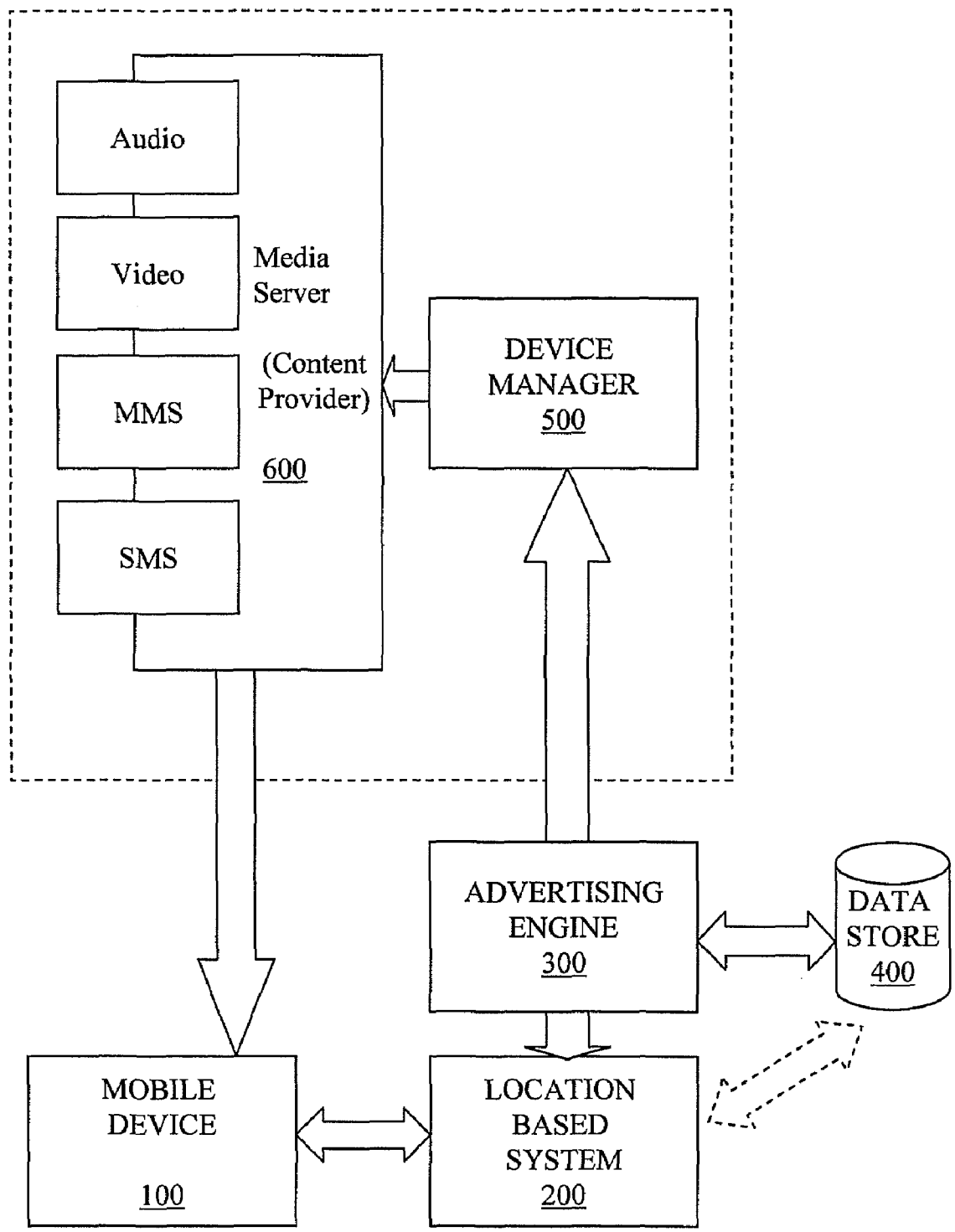
FIG. 2 shows an illustrative system overview of an embodiment of the present invention.

FIG. 2 shows an illustrative system overview of an embodiment of the present invention. In particular, in implementation, a mobile device 100 will send a message to a content provider (advertisement engine 300) via a location-based system 200 such as, for example, a network carrier. The network carrier 200 can determine the location of the mobile device using known methodologies, in addition to bounding the locations (zone) of the mobile device using geo-boundaries, as previously discussed. In alternative embodiments, an agent on the mobile device 100 can provide the location based system 200 with the location of the mobile device 100 using techniques such as, for example, A-GPS. In this latter example, the location based system 200 will bound the location (zone) of the mobile device using geo-boundaries.

In either scenario, the advertising agent 300 subscribes to the location based system 200 which will provide the location information to the advertising agent 300. In embodiments, the location information can be provided in longitudinal and longitudinal coordinates. The location based system 200 and/or the advertising agent 300 may be implemented in the computer infrastructure of FIG. 1, with the Management Tool 14a implementing the functionality and processes described herein. In other embodiments, the location based system 200 and/or the advertising agent 300 may be separate software components, hardware components or a combination thereof implemented via separate Management Tools shown in FIG. 1.

The advertising agent 300 will query a database 400 (which may be the storage system 22B of FIG. 1). During this query, the advertisement agent 300 may check the advertisement history for the mobile device 100 to determine, for example, whether the advertisement has recently been sent to the mobile user. Also, the advertising agent 300 can record information of the mobile device 100 into an advertising profile for future reference in the database 400. In further embodiments, the location based system 200 may also be in communication with the database to record and retrieve information therefrom. For example, the advertising profile may include the advertisement history of the mobile device 100 such that, upon future query by the advertisement agent 300, the same advertisement will not be provided to the same mobile device within a certain time period. Also, the database 400 can store and provide certain business rules for the particular zone to the advertisement agent 200. These business rules may be, for example, the type of advertisement to provide to a specific user of a mobile device or time limits.

The advertisement agent 300 will send an XML representation of the advertisement or service to a device manager 500. The device manager 500 will retrieve media from the media server 600 such as, for example, audio, video, MMS or SMS associated with a particular advertisement. MMS (Multimedia Messaging Service) is a standard for telephone messaging systems that allows sending messages that include multimedia objects (images, audio, video, rich text) and not just text as in Short Message Service (SMS). It is mainly deployed in cellular networks along with other messaging systems like SMS, Mobile Instant Messaging and Mobile E-mail. The media will then be formatted by the device manage, in known ways, and sent to the mobile device 100.

The location based system 200 in combination with the advertisement agent 300, for example, can track the effectiveness of the advertisements or other services. For example, using the geo-boundaries associated with zones, the location based system 200 can detect when a user has entered and/or exited a zone. By knowing this information, the location based system 200 can determine whether a user has entered or exited a store, building or other environment associated with an advertisement. If the location based system 200 detects that the user has entered the store, building or other environment it can provide such information to the advertisement agent 300 which, in turn, can record the information into the database 400. Alternatively, the location based system 200 can detect that the user has not entered or exited the store, building or other environment, in other words entered another zone, and provide such location information to the advertisement engine 300 (which can also store the information in the database). The advertisement agent 300, using this information, can then target a different advertisement and/or promotional, to the user to entice the user into the store, building or other environment of the originally detected zone.

In a further aspect of the invention, the location based system 200 can be used to prevent spamming due to skipping into and outside of the same zone. For example, the location based system 200 can detect multiple hops into and out of the same zone within a certain time period. If the time period is within a certain threshold, for example, as stored and recorded in the database the location based system 200 may not provide the location information to the advertisement agent 300. In turn, this will ensure that the advertisement agent 300 does not send multiples of the same advertisement to the same mobile device 100. Alternatively, the location based system 200 can provide this information to advertising agent 300 which will then query the database 400 to determine whether the mobile device 100 entered or exited the zone. This time frame and location based information can be used to trigger or prevent the same advertisement being sent to the mobile device 100 within a given timeframe.

Exemplary Processes

Figure 3:
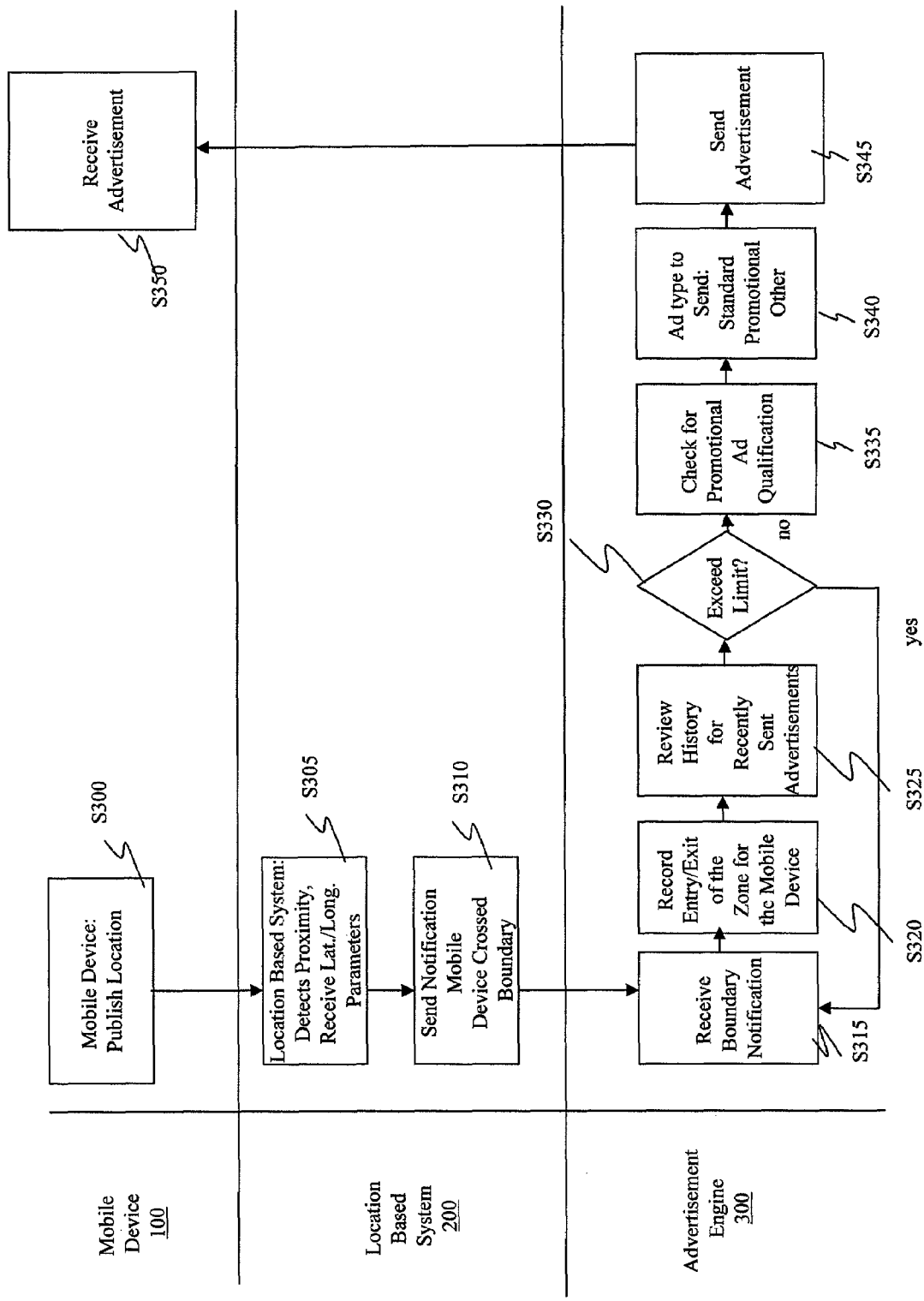
FIG. 3 shows a swim lane diagram of an exemplary process in accordance with aspects of the invention.

FIG. 3 shows a swim lane diagram of an exemplary process in accordance with aspects of the invention, which may be implemented in the environment of FIGS. 1 and/or 2. FIG. 3 may equally represent a high-level block diagram of the invention. The steps of FIG. 3 may be implemented and executed from either a server, in a client server relationship, or they may run on a user workstation (which can be generally represented in FIG. 1). Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 3 shows the actions of the mobile device 100, the location based system 200 and the advertisement engine 300 (e.g., content provider, service provider, etc.). At step S300, a mobile device publishes its location. This may be accomplished using A-GPS or other methods discussed herein. At step S305, the location based system detects the location of the mobile device, if not provided by the mobile device, and determines the bounds of the zone associated with the location of the mobile device. The zone and bounds may be based on longitudinal and longitudinal coordinates of a store (building or other environment) which subscribes to the services discussed herein and within the proximity of the mobile device. At step 310, the location based system will detect when the mobile device has crossed the boundary into a particular zone and provide this information to the advertisement engine.

At step S315, the advertising engine receives the boundary notification via any known transmission method and protocol such as, for example, TCP/IP. At step S320, the advertisement engine records the entry (and/or exit) of the mobile device into the zone. This can be recorded in a database. The advertisement engine can also review the advertisement history for the mobile device at step S325. At step S330, a determination is made as to whether the last sent advertisement was sent within a certain time period. If so, then the process returns to step S315.

If the advertisement was not sent within the time period, the process proceeds to step S335. At optional step S335, the advertisement engine checks for any promotional advertisement qualifications. At step S340, the advertisement engine will determine the type of advertisement such as, for example, a standard advertisement, a promotional advertisement or other special advertisement. In embodiments, if the location based system detects that the mobile device has left the zone the advertisement engine may send a promotional advertisement to the mobile device in an attempt to entice the user to the store (building or other environment). At step S345, the advertisement engine sends the advertisement to the mobile device using known transmission methods. At step S350, the mobile device receives the advertisements.

Exemplary Embodiments

Figure 4:
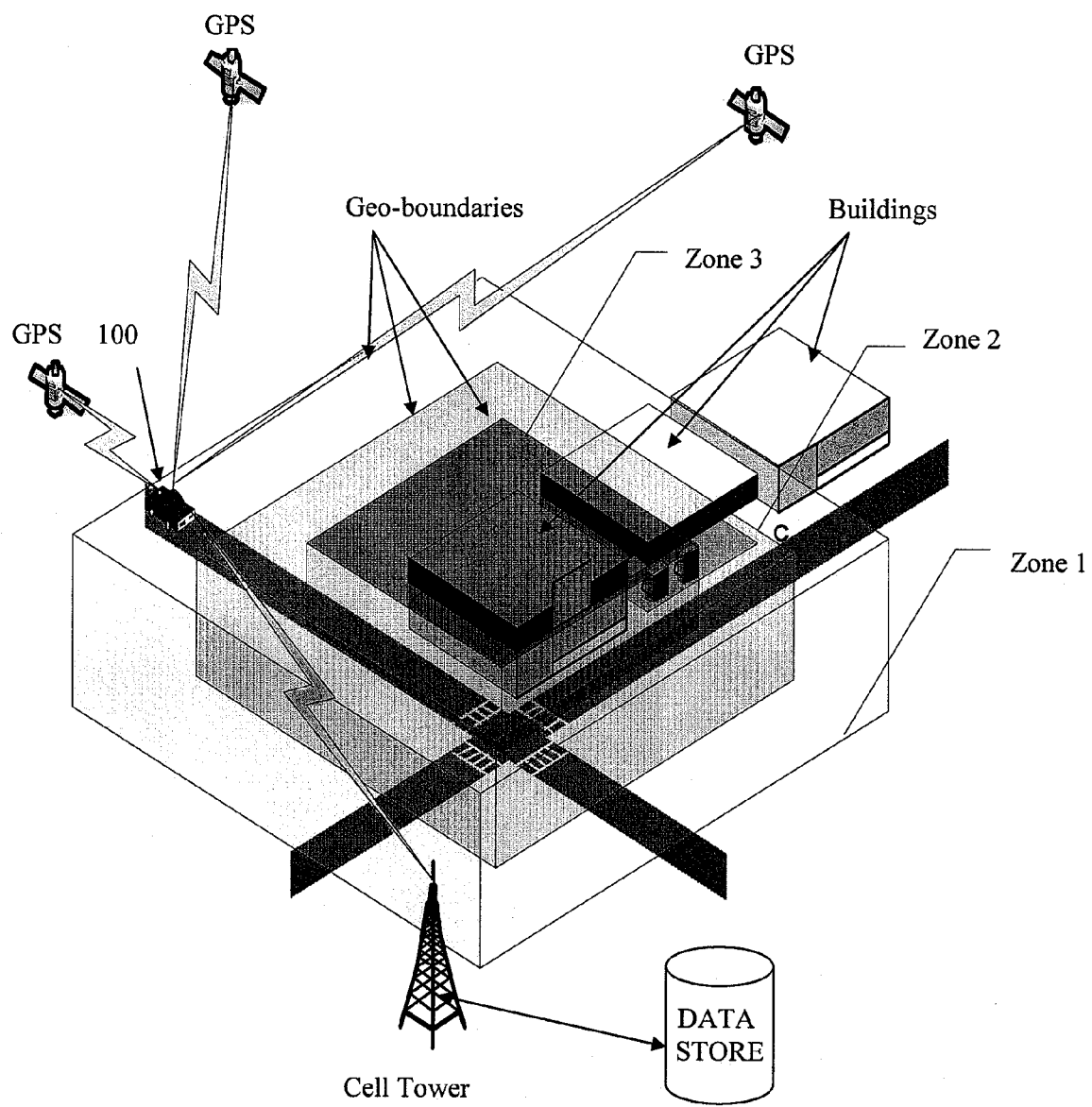
FIG. 4 shows an illustrative example implementing the processes and system in accordance with the present invention.
Figure 5:
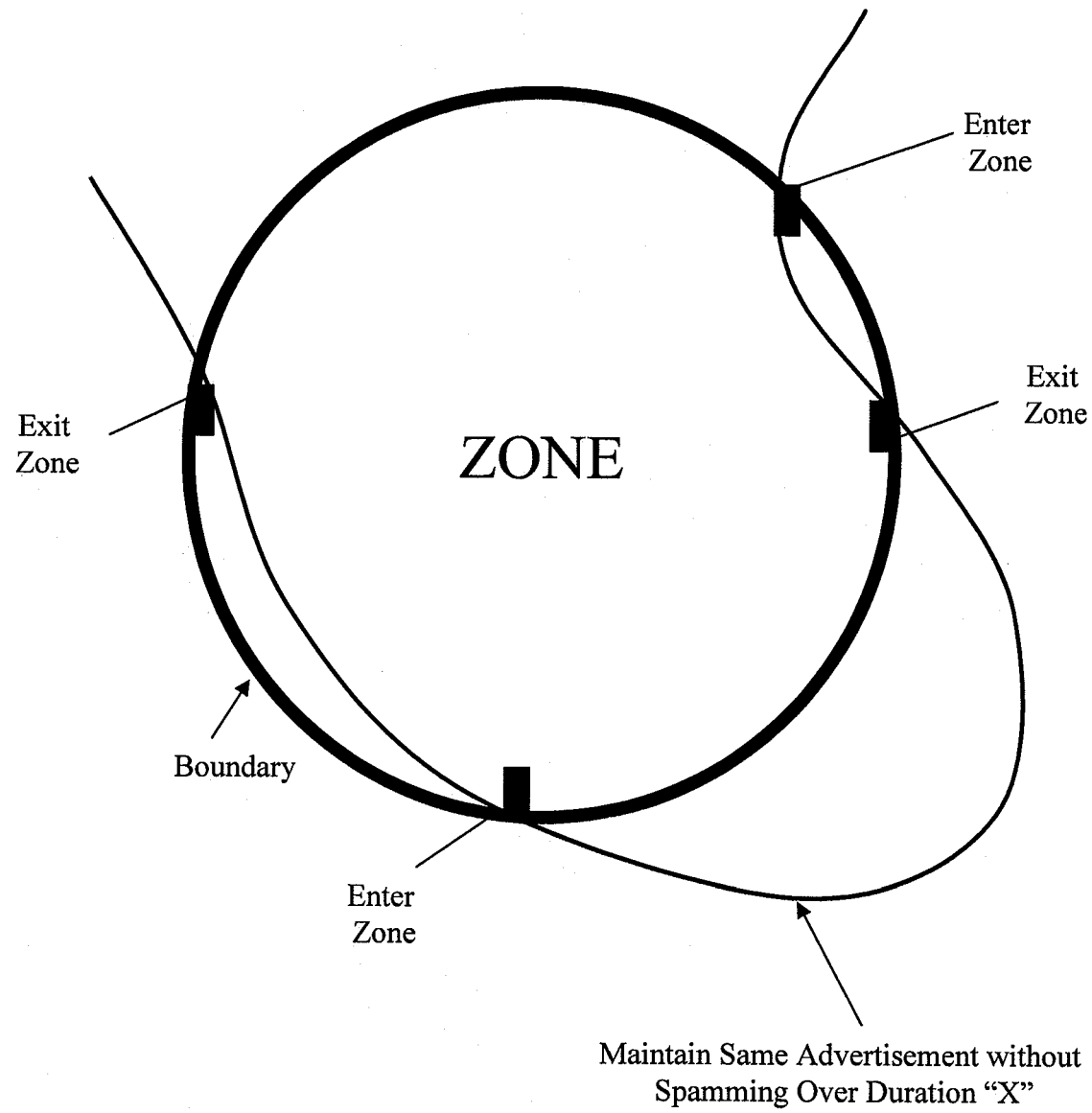
FIG. 5 shows another illustrative example implementing the processes and system in accordance with the present invention.

FIG. 4 shows an illustrative example implementing the processes and system in accordance with the present invention. FIG. 5 shows another illustrative example implementing the processes and system in accordance with the present invention. FIGS. 4 and 5 may equally represent high-level flow diagrams implementing processes in accordance with aspects of the invention.

More specifically, as shown in FIG. 4, multiple zones 1, 2 and 3 are bounded by geo-boundaries. As the mobile device 100 crosses over the geo-boundary of each zone, it is possible to more effectively target advertisements and/or services based on the precise location of the user 100 (mobile device). The location of the mobile device 100 can be detected by GPS, A-GPS or triangulation methods as discussed herein. In the example of FIG. 4, the geo-boundaries for each zone, 1, 2, 3 can be coordinated with an entrance or exit of each building. In addition or alternatively, the geo-boundaries can be associated with other landmarks, directions, etc., any of which can be used to determine whether the mobile device 100 is moving towards or away from an advertisement targeted location.

In the example of FIG. 4, the location information can be sent to the location based system and advertising engine via a cellular tower. Similarly, the advertisement associated with a certain zone can be sent to the mobile device 100 via the cellular tower. The history of the mobile user can also be recorded in a database or other storage. Using the location based information (and related recorded history information for the mobile device), the advertisement engine can:

(i) provide an advertisement to the user for an item or service that is located in a store in zone "1",
(ii) detect that the user did not visit the store in zone "1",
(iii) detect that the user is entering zone "2" (or another zone), and
(iv) provide a promotional discount for the item as the user is entering zone "2" designed to entice the user to visit the store in zone "1".

FIG. 5 shows an example of skipping into and out of a zone. In the example of FIG. 5, the mobile device is seen entering and exiting a zone several times. However, by implementing the present invention, a single advertisement is provided to the mobile device during the time period "X", even though the mobile device has entered and exited the zone several time, as detected by crossing of the boundary. This prevents spamming of advertisements thereby ensuring that the mobile device will not receive multiples of the same advertisements within a certain time period.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method comprising:
defining a zone with a plurality of geo-boundaries, wherein at least one entry point or exit point is associated with at least one of the plurality of geo-boundaries;
detecting when a mobile user enters the zone through an entry point of a first boundary of the plurality of geo-boundaries and exits the zone through an exit point of a second boundary of the plurality of geo-boundaries;
sending a message to the mobile user upon the detecting that the mobile user entered the zone through the entry point of the first boundary; and
providing a promotional message to the mobile user after sending the message and when the mobile user does not exit the zone through the exit point of the second boundary within a first predetermined time period from when the mobile user entered the zone or enters an entry point of a boundary of another zone prior to exiting the zone through the exit point of the second boundary,
wherein the message is only sent to the mobile user once within a predetermined second time period regardless of whether the mobile user has exited and reentered the zone.

2. The method of claim 1, wherein the second boundary is one of an entrance and exit of a retail or service environment associated with the message.

3. The method of claim 1, wherein the message is an advertisement.

4. The method of claim 1, wherein the promotional message is provided to the mobile user when the mobile user does not exit the zone through the exit point of the second boundary within the predetermined time period from when the mobile user entered the zone through the entry point.

5. The method of claim 4, wherein the promotional message is an advertisement enticing the mobile user to purchase an item or service associated with the promotional message.

6. The method of claim 1, further wherein the promotional message is provided to the mobile user when the mobile user enters an entry point of a boundary of the another zone prior to crossing the second boundary.

7. The method of claim 1, wherein the message is at least one of an SMS, MMS, audio and video advertisement for an item or service.

8. The method of claim 1, further comprising defining a plurality of zones, each of the plurality of zones including at least two boundaries, wherein the detecting detects when the mobile user has entered and exited any of the plurality of zones based on the mobile user entering or exiting any number of entry points or exit points associated with one of the at least two boundaries of each of the plurality of zones.

9. The method of claim 1, wherein the steps of claim 1 are provided on a computing infrastructure which is at least one of maintained, deployed, created and supported by a service provider.

10. The method of claim 9, wherein the service provider maintains, deploys, supports and creates the computing infrastructure on a fee and/or subscription basis.

11. The method of claim 1, wherein the steps of claim 1 are provided on a software component, a hardware component or a combination of the software component and the hardware component.

12. The method of claim 1, further comprising recording an advertisement history for the mobile user which includes a type of each advertisement provided to the mobile user and a time in which the mobile user last received the advertisement.

13. The method of claim 1, wherein the sending of the message is by an advertiser or third party service provider.

14. A method comprising:
defining a zone with a plurality of geo-boundaries, wherein at least one entry point or exit point is associated with at least one of the plurality of geo-boundaries;
detecting when a mobile user enters the zone through an entry point of a first boundary of the plurality of geo-boundaries and exits the zone through an exit point of a second boundary of the plurality of geo-boundaries;
sending a message to the mobile user upon the detecting that the mobile user entered the zone through the entry point of the first boundary;
providing a second message that is a promotional advertisement to the mobile user after sending the message and when the mobile user does not exit the zone through the exit point of the second boundary within a predetermined time period from when the mobile user entered the zone through the entry point or enters an entry point of a boundary of another zone prior to exiting the zone through the exit point of the second boundary;

sending only one advertisement to the mobile user within a predetermined time period regardless of whether the mobile user has exited and reentered the zone; and defining a plurality of zones, each of the plurality of zones including at least two boundaries, wherein the detecting detects when the mobile user has entered and exited any of the plurality of zones based on the mobile user entering or exiting any number of entry points or exit points associated with one of the at least two boundaries of each of the plurality of zones.

15. The method of claim 14, wherein:

the message and the second message is at least one of an SMS, MMS, audio and video advertisement for an item or service; and the second boundary is one of an entrance and exit of a retail or service environment associated with the message and the second message.

16. A method for advertising comprising:

providing a computer infrastructure being operable to:

define a zone with a plurality of geo-boundaries, wherein at least one entry point or exit point is associated with at least one of the plurality of geo-boundaries;

detect when a mobile user enters the zone through an entry point of a first boundary of the plurality of geo-boundaries and exits the zone through an exit point of a second boundary of the plurality of geo-boundaries;

send an advertisement to the mobile user upon detecting that the mobile user entered the zone through the entry point of the first boundary; and provide a promotional advertisement to the mobile user after sending the advertisement and when the mobile user does not exit the zone through the exit point of the second boundary within a first predetermined time period from when the mobile user entered the zone or enters an entry point of a boundary of another zone prior to exiting the zone through the exit point of the second boundary, wherein the advertisement is only sent to the mobile user once within a second predetermined time period regardless of whether the mobile user has exited and reentered the zone.

17. The method of claim 16, wherein the computer infrastructure is at least one of supported, deployed, maintained, and created by a service provider.

18. A method of advertising comprising:

providing a computer infrastructure being operable to:

define a zone with a plurality of geo-boundaries, wherein at least one entry point or exit point is associated with at least one of the plurality of geo-boundaries;

detect when a mobile user enters the zone through an entry point of a first boundary of the plurality of geo-boundaries and exits the zone through an exit point of a second boundary of the plurality of geo-boundaries;

send an advertisement to the mobile user upon detecting that the mobile user entered the zone through the entry point of the first boundary;

provide a second advertisement to the mobile user when the mobile user does not exit the zone through the exit point of the second boundary within a predetermined time period from when the mobile user entered the zone through the entry point or enters an entry point of a boundary of another zone prior to exiting the zone through the exit point of the second boundary;

send only one advertisement to the mobile user within a predetermined time period regardless of whether the mobile user has exited and reentered the zone; and define a plurality of zones, each of the plurality of zones including at least two boundaries, wherein the detecting detects when the mobile user has entered and exited any of the plurality zones based on the mobile user entering or exiting any number of entry points or exit points associated with one of the at least two boundaries of each of the plurality of zones, wherein:

the advertisement and the second advertisement is at least one of an SMS, MMS, audio and video advertisement for an item or service; and the second boundary is one of an entrance and exit of a retail or service environment associated with the message.

19. The method of claim 16, wherein the steps of claim 16 are provided on a software component, a hardware component or a combination of the software component and the hardware component.

20. A computer program product comprising a tangible computer usable medium having readable program code tangibly embodied in the medium, the computer program product being operable to:

define a zone with a plurality of geo-boundaries, wherein at least one entry point or exit point is associated with at least one of the plurality of geo-boundaries;

determine when a mobile user has entered through an entry point of a first boundary of the plurality of geo-boundaries into the zone, which is defined by the first boundary and a second boundary of the plurality of geo-boundaries;

provide an advertisement to the mobile user when the mobile user has entered through the entry point of the first boundary, the advertisement being associated with a subscriber to services accessible through the computer program product; and at least one of:

provide a second advertisement to the mobile user if the mobile user does not exit the zone through an exit point of the second boundary within a predetermined amount of time from when the mobile user entered the zone through the entry point or if the mobile user enters an entry point of a boundary of another zone prior to exiting the zone through the exit point of the second boundary; and determine that the mobile user has exited the exit point of the second boundary and use such information to deduce that the mobile user at least entered or exited an environment associated with the advertisement; and send only one advertisement to the mobile user within a predetermined time period regardless of whether the mobile user has exited and reentered the zone.

21. The computer program product of claim 20, wherein the computer program product is further operable to record advertisement history of the mobile user and use the advertisement history when providing an advertisement to the mobile user.

22. The computer program product of claim 20, wherein the advertisement is at least one of an SMS, MMS, audio and video advertisement for an item or service.

23. The computer program product of claim 20, wherein the computer program product is further operable to define a plurality of zones, each of the plurality of zones including at least two boundaries, wherein the determining can determine when the mobile user has entered and exited any of the plurality of zones based on the mobile user entering or exiting any number of entry points or exit points associated with one of the at least two boundaries of each of the plurality of zones.

24. The computer program product of claim 20, wherein the computer program product is provided on a computing infrastructure which is at least one of maintained, deployed, created and supported by a service provider.

25. The computer program product of claim 24, wherein the service provider maintains, deploys, supports and creates the computing infrastructure on a fee and/or subscription basis.

* * * * *